United States Patent
Werner et al.

(10) Patent No.: US 9,975,461 B2
(45) Date of Patent: May 22, 2018

(54) ARRANGEMENT OF COMPONENTS, VEHICLE SEAT, AND PRODUCTION METHOD

(71) Applicant: Johnson Controls GmbH, Burscheid (DE)

(72) Inventors: Hans-Georg Werner, Langenfeld (DE); Bernd Gross, Langenfeld (DE); Andreas Dannheisig, Sassenberg (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 70 days.

(21) Appl. No.: 14/400,909

(22) PCT Filed: May 14, 2013

(86) PCT No.: PCT/EP2013/059872
§ 371 (c)(1),
(2) Date: Nov. 13, 2014

(87) PCT Pub. No.: WO2013/171180
PCT Pub. Date: Nov. 21, 2013

(65) Prior Publication Data
US 2015/0130252 A1    May 14, 2015

(30) Foreign Application Priority Data
May 14, 2012    (DE) .................. 10 2012 009 505

(51) Int. Cl.
*A47C 3/12*    (2006.01)
*B60N 2/68*    (2006.01)
(Continued)

(52) U.S. Cl.
CPC ............. *B60N 2/686* (2013.01); *B60N 2/682* (2013.01); *F16B 15/00* (2013.01); *F16B 5/04* (2013.01);
(Continued)

(58) Field of Classification Search
CPC .. A47C 3/12; A47C 5/12; B60N 2/686; B60N 2/682; F16B 15/00
(Continued)

(56) References Cited

U.S. PATENT DOCUMENTS 3,531,157 A * 9/1970 Duckett .................. A47C 1/12
297/248
3,583,762 A * 6/1971 Strien .................... B60N 2/233
297/361.1
(Continued)

FOREIGN PATENT DOCUMENTS

CN    101981328 A    2/2011
DE    75 21 239 U    11/1975
(Continued)

OTHER PUBLICATIONS

Office Action dated Feb. 23, 2016, in corresponding Japanese application No. 2015-512023, 3 pages.
(Continued)

*Primary Examiner* — Syed A Islam
(74) *Attorney, Agent, or Firm* — Foley & Lardner LLP

(57) ABSTRACT

An arrangement of components, in particular for a vehicle seat, includes a first component and a second component which are interconnected by a connector. The connector includes a nail-shaped pin that has a grooved drive stud.

11 Claims, 2 Drawing Sheets

(51) Int. Cl.
*F16B 15/00* (2006.01)
*F16B 5/04* (2006.01)
*F16B 17/00* (2006.01)

(52) U.S. Cl.
CPC ....... *F16B 17/008* (2013.01); *Y10T 29/49833* (2015.01)

(58) Field of Classification Search
USPC .......................... 297/452.14, 452.15, 452.65
See application file for complete search history.

(56) References Cited

U.S. PATENT DOCUMENTS

| | | | |
|---|---|---|---|
| 3,645,163 A | 2/1972 | Byland | |
| 3,647,260 A * | 3/1972 | Grant | A47C 7/185 |
| | | | 297/218.1 |
| 3,788,701 A * | 1/1974 | Massaccesi | A47C 3/12 |
| | | | 297/449.1 |
| 3,841,703 A * | 10/1974 | Lowe | B61D 33/0042 |
| | | | 297/440.2 |
| 3,848,925 A * | 11/1974 | Harder, Jr. | A47C 3/12 |
| | | | 297/283.2 |
| 3,921,495 A | 11/1975 | Braun et al. | |
| 4,577,907 A * | 3/1986 | Talmon | A47C 5/12 |
| | | | 297/451.4 |
| 4,580,836 A * | 4/1986 | Verney | A47C 7/445 |
| | | | 297/296 |
| 4,671,570 A * | 6/1987 | Hockenberry | A47C 1/022 |
| | | | 297/313 |
| 4,717,202 A * | 1/1988 | Batchelder, III | A47C 11/00 |
| | | | 297/182 |
| 4,730,873 A * | 3/1988 | Janz | B60N 2/682 |
| | | | 297/232 |
| 5,795,024 A * | 8/1998 | Collins | B60N 2/23 |
| | | | 297/361.1 |
| 5,924,771 A * | 7/1999 | Marchesi | B60N 2/242 |
| | | | 297/440.14 |
| 6,851,906 B2 | 2/2005 | Gassmann et al. | |
| 7,128,373 B2 * | 10/2006 | Kurtycz | B60N 2/686 |
| | | | 297/452.14 |
| 7,207,761 B2 * | 4/2007 | Dill | F16B 15/06 |
| | | | 411/440 |
| 7,575,283 B2 * | 8/2009 | Crowe | A47C 4/02 |
| | | | 297/158.1 |
| 7,891,740 B2 * | 2/2011 | Boes | B60N 2/686 |
| | | | 297/452.14 |
| 8,251,425 B2 | 8/2012 | Jungert et al. | |
| 8,458,885 B2 | 6/2013 | Bianco et al. | |
| 8,794,893 B2 * | 8/2014 | Aihara | B21G 3/12 |
| | | | 411/440 |
| 8,998,316 B2 * | 4/2015 | Naughton | B29C 47/0019 |
| | | | 29/527.1 |
| 2006/0103228 A1 * | 5/2006 | Gupta | B29C 49/4802 |
| | | | 297/452.65 |
| 2007/0278842 A1 * | 12/2007 | Ikai | B60N 2/682 |
| | | | 297/452.14 |
| 2009/0313383 A1 | 12/2009 | Leung et al. | |
| 2009/0315383 A1 | 12/2009 | Braun | |

FOREIGN PATENT DOCUMENTS

| | | |
|---|---|---|
| DE | 40 36 928 A1 | 5/1992 |
| DE | 1020090 20 586 A1 | 11/2010 |
| EP | 1 253 332 A2 | 10/2002 |
| EP | 2 423 518 A2 | 2/2012 |
| FR | 2195285 A5 | 3/1974 |
| GB | 2 215 600 A | 9/1989 |
| GB | 2 250 069 A | 5/1992 |
| JP | 01-005822 | 1/1989 |
| JP | 05-556530 | 7/1993 |
| JP | H06-213220 A | 8/1994 |
| JP | 2003-097523 A | 4/2003 |
| JP | 2010-260537 A | 11/2010 |
| WO | WO-2009/152478 A1 | 12/2009 |

OTHER PUBLICATIONS

International Preliminary Report on Patentability and Written Opinion of the International Searching Authority dated Nov. 27, 2014, 10 pages.
International Search Report dated Aug. 28, 2013, in PCT/EP2013/059872, 8 pages.
Office Action dated Dec. 11, 2013 in German priority application No. 10 2012 009 505.8, 6 pages.
Office Action dated Nov. 23, 2015, received in corresponding Chinese application No. 201380024986.X, 6 pages.
Office Action dated Nov. 8, 2016, received in corresponding Japanese application No. 2015-512023, 2 pages.

* cited by examiner

ARRANGEMENT OF COMPONENTS, VEHICLE SEAT, AND PRODUCTION METHOD

CROSS REFERENCE TO RELATED APPLICATIONS

The present application is a U.S. National Stage of International Application No. PCT/EP2013/059872 filed on May 14, 2013, which claims the benefit of German Patent Application No. 10 2012 009 505.8 filed on May 14, 2012, the entire disclosures of all of which are incorporated herein by reference.

PRIOR ART

The invention is based on an arrangement of components as claimed in the preamble of claim 1. Such arrangements of components are generally known and serve to connect together different components so that said components are able to be mechanically load-bearing. In order to save weight, sandwich components and hybrid components are increasingly used in vehicles. Conventional connecting techniques, such as welding and bonding, are excluded for such components, in particular if the components are made from different materials such as aluminum and steel or plastics-steel.

It is, therefore, the object of the present invention to provide an arrangement of components which permits the connection of all types of component and at the same time is able to be produced rapidly, easily and thus cost-effectively.

This object is achieved by an arrangement of components, in particular for a vehicle seat, comprising a first component and a second component, wherein the first component and the second component are connected together by means of a connection means, wherein the connection means comprises a nail-shaped pin.

Advantageously, by means of the nail-shaped pin, a mechanically stable connection is produced between the first and second components. This connection may be produced, for example, by the pin being driven through the first and second components. Advantageously, therefore, a bonded connection, a welded connection or a further connection between the first and second components is not required. By means of the pin, therefore, even hybrid components or sandwich components may be connected together. It is also conceivable for the first component and/or the second component in each case to consist of a plurality of plate-shaped elements spaced apart from one another. According to a preferred embodiment of the present invention, the pin comprises a grooved drive stud. By means of a grooved drive stud, both a positive and a non-positive connection is able to be produced between the first to assess and the second component. Thus a mechanically stable connection is achieved. Additionally, a grooved drive stud is relatively cost-effective so that the production costs of the arrangement of components may be reduced in comparison with the prior art. A person skilled in the art naturally understands automatically that further connections, which are based, for example, on connecting techniques by a material, non-positive and/or positive connection, may exist between the first and second components in addition to the connection between the first component and in the second component by means of the grooved drive stud. It is conceivable that the grooved drive stud serves for the final connection of the first component to the second component or the grooved drive stud only serves for prefixing the first component to the second component until, in a final mounting process, the first and second components are finally connected together by further high-strength connections.

According to a preferred embodiment of the present invention, it is provided that the first component comprises a first opening and the second component comprises a second opening, wherein the first opening and the second opening are arranged so as to be substantially congruent and wherein the grooved drive stud extends through the first and second openings. Advantageously, the introduction of a first opening in the first component on top of a second opening in the second component ensures that when driving in the grooved drive stud, the first and second components are not deformed or only slightly deformed. Moreover, in this manner it may be ensured that an intermediate material which is arranged between two plate-shaped elements is not damaged by the introduction of the grooved drive stud. This is advantageous, in particular, in sandwich components. The grooved drive stud is, in particular, introduced such that the grooved drive stud is arranged positively and non-positively in the first opening and also positively and non-positively in the second opening. To this end, the diameters of the first and/or second opening are preferably slightly smaller than the diameter of the grooved drive stud. The grooved drive stud is thus wedged into the walls of the openings.

According to a further preferred embodiment of the present invention, it is provided that the pin comprises at least one groove and/or rib on its outer peripheral surface, wherein the at least one groove and/or rib preferably extends in an axial direction of the pin or substantially perpendicular to the axial direction in the peripheral direction of the pin. The groove and/or rib advantageously ensure that the strength of the connection is increased between the first and second components. The grooved drive stud preferably comprises a cylindrical shank, wherein a first end of the shank has a tapered tip and wherein a second end of the shank has a flattened portion. By means of an impulse exerted on the flattened portion, the grooved drive stud is driven into the first and second components. It is conceivable that both the first component and the second component are completely penetrated by the grooved drive stud or only one of the two components is completely penetrated by the grooved drive stud, whilst the grooved drive stud only partially penetrates the other component.

According to a preferred embodiment, it is provided that the first component and the second component are made from a different material and/or have a different thickness parallel to the axial direction. Advantageously, very different components may be connected together by the grooved drive stud, whatever the respective materials or geometries.

A further subject of the present invention is a vehicle seat for a motor vehicle comprising a structural component and an in particular plate-shaped element, wherein the structural component and the element comprise an arrangement of components according to the invention. It is conceivable, for example, that the first component functions as a load-bearing structural component and the second component as a plate-shaped element, wherein the structural component and the plate-shaped element are connected together by means of the grooved drive stud. Steel, for example, may be used for the structural component which has to withstand relatively high loads, whilst a plastics, composite or aluminum material may be used for the plate-shaped element which comprises, for example, a cover panel. The safety of the vehicle may thus be optimized in terms of the vehicle weight. A more lightweight vehicle seat additionally reduces the fuel consumption of the vehicle.

A further subject of the present invention is a method for producing an arrangement of components according to the invention, wherein in a first step the first component and the second component are provided and wherein in a second step the first component and the second component are connected together, characterized in that in the second step for connecting the first and second components the nail-shaped pin is driven through the first and second components. The present method position an arrangement of components is able to be carried out substantially more easily and thus more cost-effectively relative to the prior art. A further advantage of the method is that the connection may be created from one mounting side. As a result, the mounting cost is further reduced.

According to a preferred development of the present method, it is provided that in the first step the first and second components are brought to bear against one another and/or that in the first step the first and/or second components are predrilled. The grooved drive stud may thus be driven into the material more easily and damage to the material is substantially avoided.

Further details, features and advantages of the invention are revealed from the drawings and from the following description of preferred embodiments, with reference to the drawings. The drawings in this case merely illustrate exemplary embodiments of the invention which do not restrict the essential inventive idea.

EMBODIMENTS OF THE INVENTION

Figure 1:
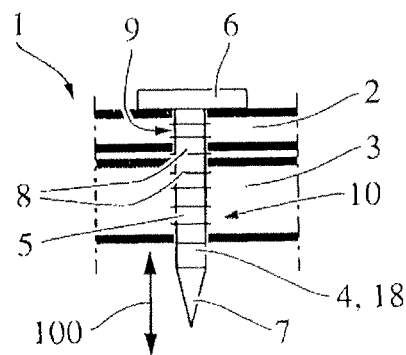
FIG. 1 shows a schematic sectional view of an arrangement of components according to an exemplary embodiment of the present invention.

In the different figures the same parts are always provided with the same reference numerals and in each case are therefore generally only cited and/or mentioned once.

A schematic sectional view of an arrangement of components 1 according to an exemplary embodiment of the present invention is illustrated in FIG. 1. The arrangement of components 1 comprises a first component 2 and a second component 3. The first and second components 2, 3 are in the present example parts of a vehicle seat 11 of a motor vehicle (partially shown in FIG. 2). The first component 2 bears against the second component 3. The first and second components 2, 3 are fixedly connected together via a connection means in the form of a grooved drive stud 4. The grooved drive stud 4 comprises a shank 5 configured as a hollow cylinder, one end thereof being provided with a flattened portion 6 and the other end thereof being provided with a tapered tip 7. In the shank region, the grooved drive stud 4 has a plurality of channels and grooves 8 which extend perpendicularly to an axial direction 100 of the grooved drive stud 4 and thus extend in a peripheral direction of the grooved drive stud 4. The first component 2 has a first opening 9 in the region of the grooved drive stud 4, whilst the second component 3 has a second opening 10 in the region of the grooved drive stud 4. The first and second openings 9, 10 have a slightly smaller diameter than the shank region. For producing the connection between the first and second components 2, 3, the grooved drive stud 4, with its tip 7 in front, is driven through the first and second openings 9, 10. To this end, a force is exerted on the flattened portion 6 in the axial direction 100. The channels and grooves 8 become wedged in the material of the first and second components 2, 3 so that a positive and a non-positive connection is produced between the first component 2 and the grooved drive stud 4, as well as between the second component 3 and the grooved drive stud 4. It is conceivable that the first component 2 and the second component 3 are made from different materials. For example, one of the two components 2, 3 comprises a steel components teaches the other component 2, 3 is made from aluminum, plastics or a composite construction. Alternatively, both components 2, 3 or one of the two components 2, 3 comprise(s) a sandwich component. It is also conceivable that further components are fastened to the first and second components 2, 3 by means of the one grooved drive stud 4.

Figure 2:
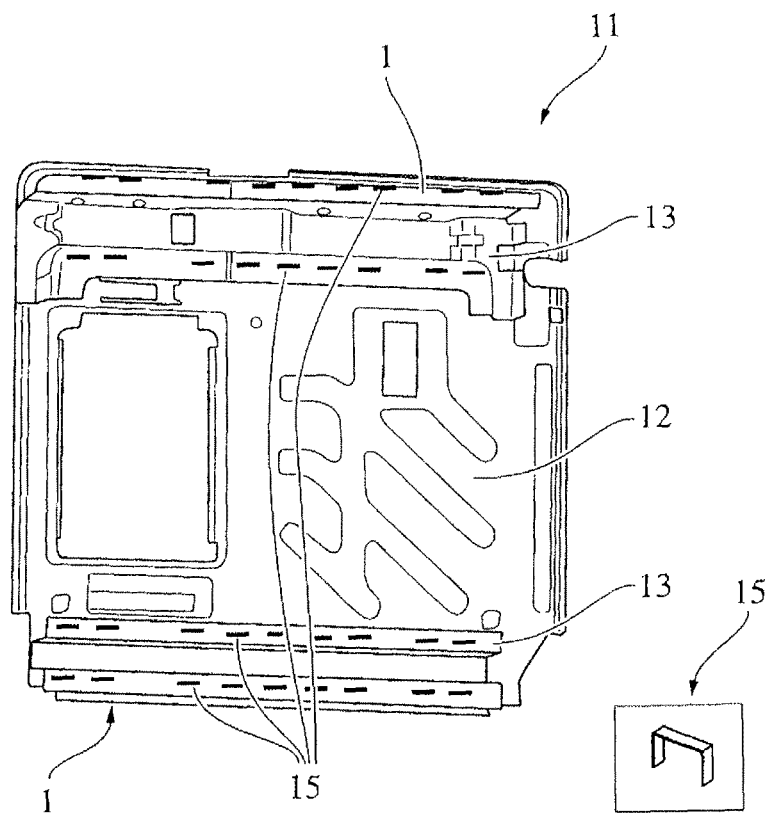
FIG. 2 shows a schematic partial view of a vehicle seat comprising an arrangement of components according to the exemplary embodiment of the present invention.

In FIG. 2, a schematic partial view is shown of a vehicle seat 11 comprising an arrangement of components 1 according to the exemplary embodiment of the present invention. The vehicle seat 11 comprises a plate-shaped element 12 which functions as a base plate for the backrest of the vehicle occupant 11 and two structural components 13 which function as reinforcing struts for the base plate. The structural components 13 and the element 12 form together a hybrid component. The structural components 13 are fastened to the element 12 via a plurality of grooved drive studs 4 according to the arrangement of components 1 shown in FIG. 1. It is conceivable that the grooved drive studs 4 serve for the subsequent fastening of the structural components 13 to the element 12, or the grooved drive studs 4 only serve for premounting the structural components 13 on the element 12 until the structural components 13 are connected by further high-strength connections to the element 12.

The structural components 13 are also fastened to the base plate, for example via staples 15. For illustration purposes, such a staple 15 is also shown schematically in a small detailed view, wherein the staple 15 is preferably made from high-grade steel in order to obtain a high-strength connection. It is also conceivable that the structural components 13 are also bonded to the element 12. According to a further embodiment, the structural components 13 are also connected to the element 12 by a tab connection 14. The principle of the tab connection 14 is explained below with reference to FIGS. 3a, 3b and 3c.

Figure 3A:
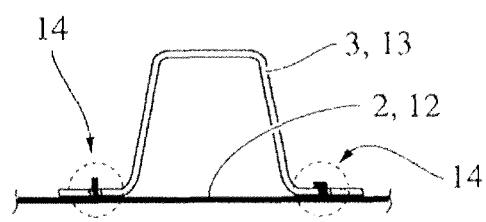
FIGS. 3a, 3b, 3c show schematic detailed views of an arrangement of components provided with further connections according to the exemplary embodiment of the present invention.
Figure 3B:
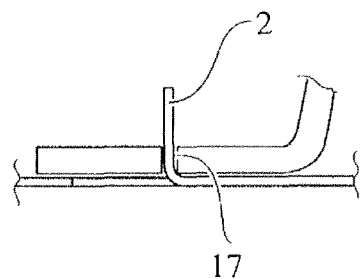
Figure 3C:
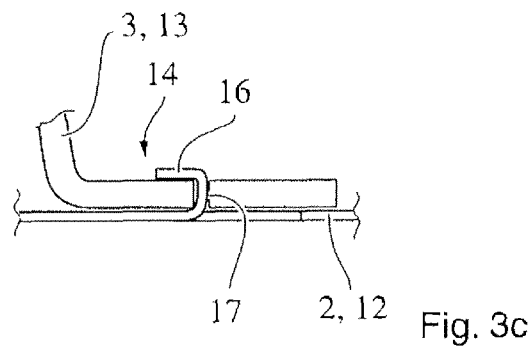

In FIGS. 3a, 3b, 3c, schematic detailed views are shown of an arrangement of components 1 provided with further connections according to the exemplary embodiment of the present invention. The tab connection 14 is produced by a tab 16 being stamped out of the first component 2, in this case the plate-shaped element 12, and being bent back from the plane of the element 12. This tab 16 is subsequently inserted through an opening 17 in the second component 3, in this case a structural component 13 (see FIG. 3b) and then bent back (see FIG. 3c). In this manner, a positive and/or non-positive connection is produced between the first and second components 2, 3 in the form of a further connection 14.

LIST OF REFERENCE NUMERALS

1 Arrangement of components
2 First component

3 Second component
4 Grooved drive stud
5 Shank
6 Flattened portion
7 Tip
8 Channels, grooves
9 First opening
10 Second opening
11 Vehicle seat
12 Plate-shaped element
13 Structural component
14 Tab connection
15 Staple
16 Tab
17 Opening
18 Pin
100 Axial direction

The invention claimed is:

1. An arrangement of components for a vehicle seat, comprising:
 a first component that is a plate-shaped element;
 a second component that is a structural component and comprises a tab-receiving opening that extends between a first side and a second side of the second component;
 a connector that connects together the first component and the second component, wherein the connector comprises a pin of nail-shaped configuration; and
 a tab connection that comprises a tab stamped out of the first component, wherein the tab extends from a first end and terminates at a second end along an end piece of the tab, wherein the end piece of the tab is bent in a first direction that is at an angle to a plane of the plate-shaped element,
 wherein the end piece of the tab extends through the tab-receiving opening in the second component and is bent in a second direction that is at an angle to the first direction such that the first end of the tab is positioned along the first side of the second component and the second end of the tab is positioned along the second side of the second component.

2. The arrangement of components as claimed in claim 1, wherein the pin comprises a grooved drive stud.

3. The arrangement of components as claimed in claim 2, wherein the first component comprises a first opening and the second component comprises a second opening, wherein the first opening and the second opening are arranged so as to be substantially congruent and wherein the grooved drive stud extends through the first and second openings.

4. The arrangement of components as claimed in claim 3, wherein the grooved drive stud is arranged positively and non-positively in the first opening and positively and non-positively in the second opening.

5. The arrangement of components as claimed in claim 1, wherein the pin comprises at least one of a groove or a rib on its outer peripheral surface, wherein the at least one the groove or the rib extends in an axial direction of the pin or substantially perpendicularly to the axial direction in a peripheral direction of the pin.

6. The arrangement of components as claimed in claim 1, wherein the first component and the second component at least one of are made from a different material or have a different thickness parallel to an axial direction of the pin.

7. The arrangement of claim 1, wherein the tab is bent backward around the tab-receiving opening of the second component in the second direction.

8. The arrangement of claim 1, wherein the first side of the second component and the second side of the second component are directly opposite each other through a wall of the second component.

9. A vehicle seat for a motor vehicle comprising:
 a structural component that comprises a tab-receiving opening that extends between a first side and a second side of the structural component;
 a plate-shaped element;
 a connector that connects together the plate-shaped element and the structural component, wherein the connector comprises a pin of nail-shaped configuration; and
 a tab connection that comprises a tab stamped out of the plate-shaped element, wherein the tab extends from a first end and terminates at a second end along an end piece of the tab, wherein the end piece of the tab is bent in a first direction that is at an angle to a plane of the plate-shaped element,
 wherein the end piece of the tab extends through the tab-receiving opening in the structural component and is bent in a second direction that is at an angle to the first direction such that the first end of the tab is positioned along the first side of the structural component and the second end of the tab is positioned along the second side of the structural component.

10. A method for producing an arrangement of components as claimed in claim 1 comprising:
 providing a first component that is the plate-shaped element and a second component that is the structural component in a first step;
 connecting the first component and the second component together in a second step,
 wherein connecting the first and second components together comprises driving the pin at least partially through the first and second components; and
 forming the tab connection, wherein forming the tab connection comprises stamping the tab out of the first component, bending the end piece of the tab in the first direction that is at an angle to the plane of the plate-shaped element, inserting the end piece of the tab through the tab-receiving opening in the second component, and bending the end piece of the tab in the second direction that is at an angle to the first direction.

11. The method as claimed in claim 10, wherein, at least one of, in the first step, the first and second components are brought to bear against one another, or, in the first step, at least one of the first component or the second component is predrilled.

* * * * *